July 18, 1944.    M. L. SVIKHART    2,353,794
MATERIAL WORKING APPARATUS
Filed Dec. 8, 1942    3 Sheets-Sheet 1
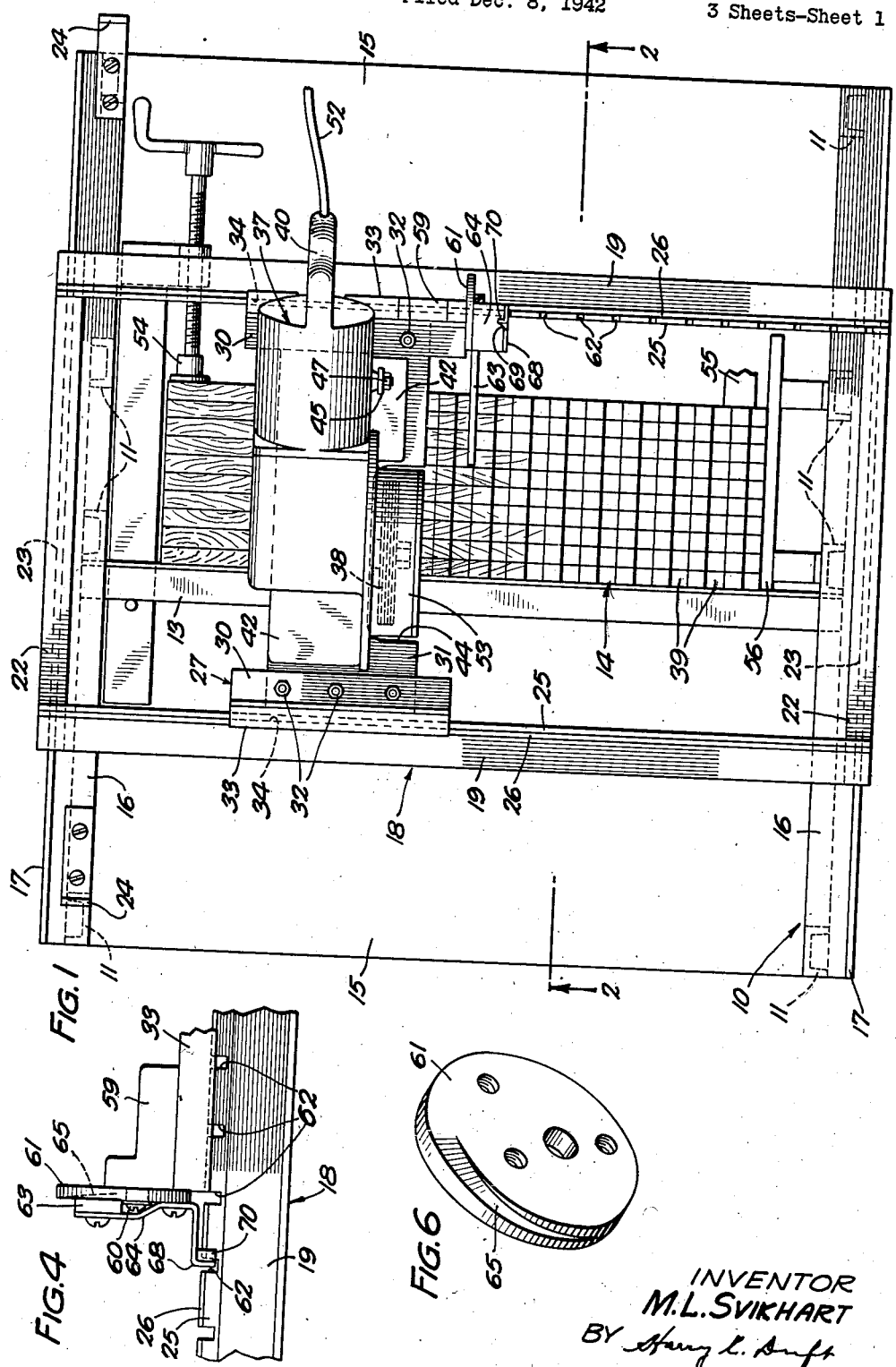
INVENTOR
M.L. SVIKHART
BY *Harry L. Duft*
ATTORNEY July 18, 1944.  M. L. SVIKHART  2,353,794
MATERIAL WORKING APPARATUS
Filed Dec. 8, 1942  3 Sheets-Sheet 2
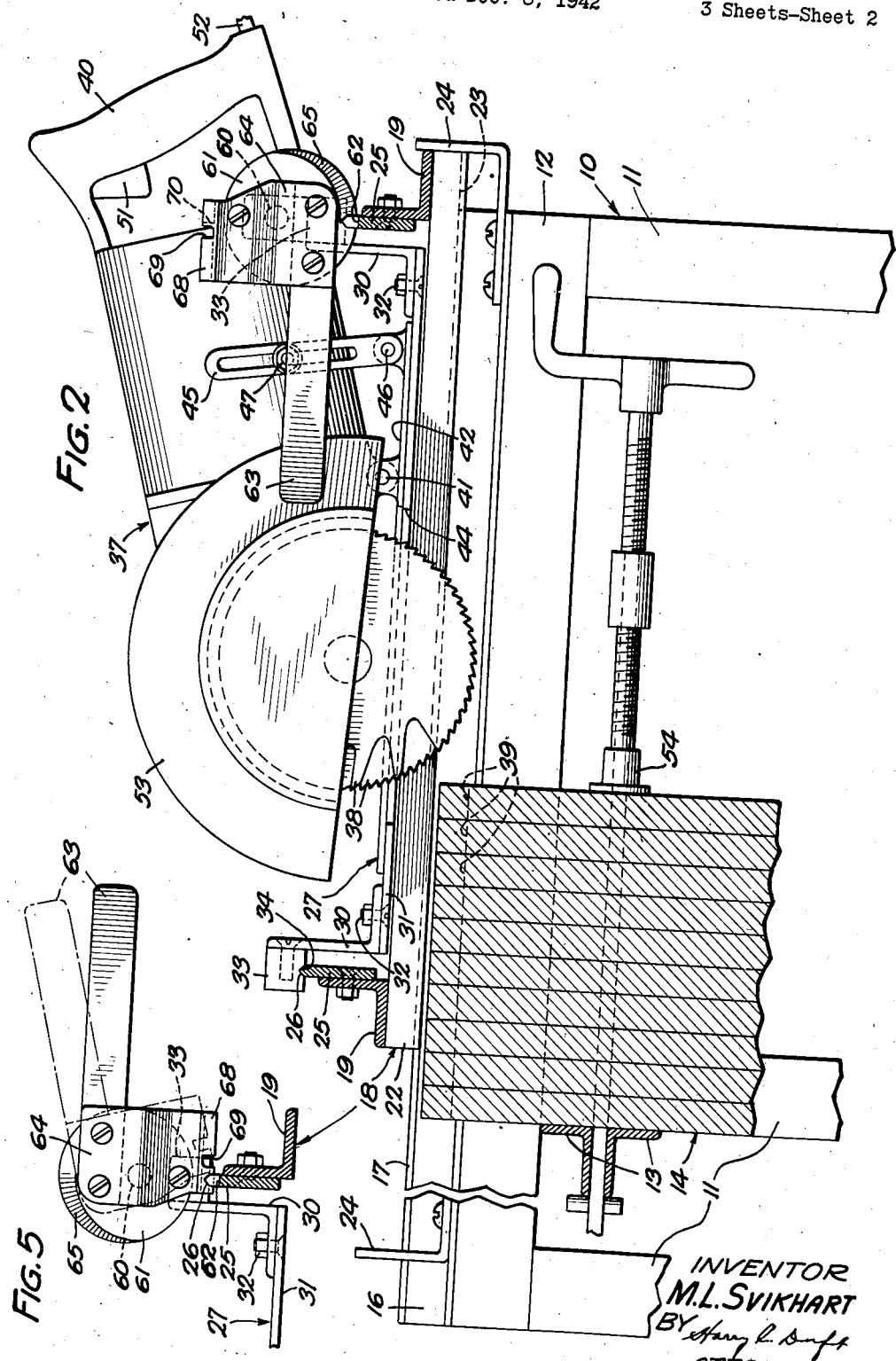
INVENTOR
M. L. SVIKHART
BY
ATTORNEY

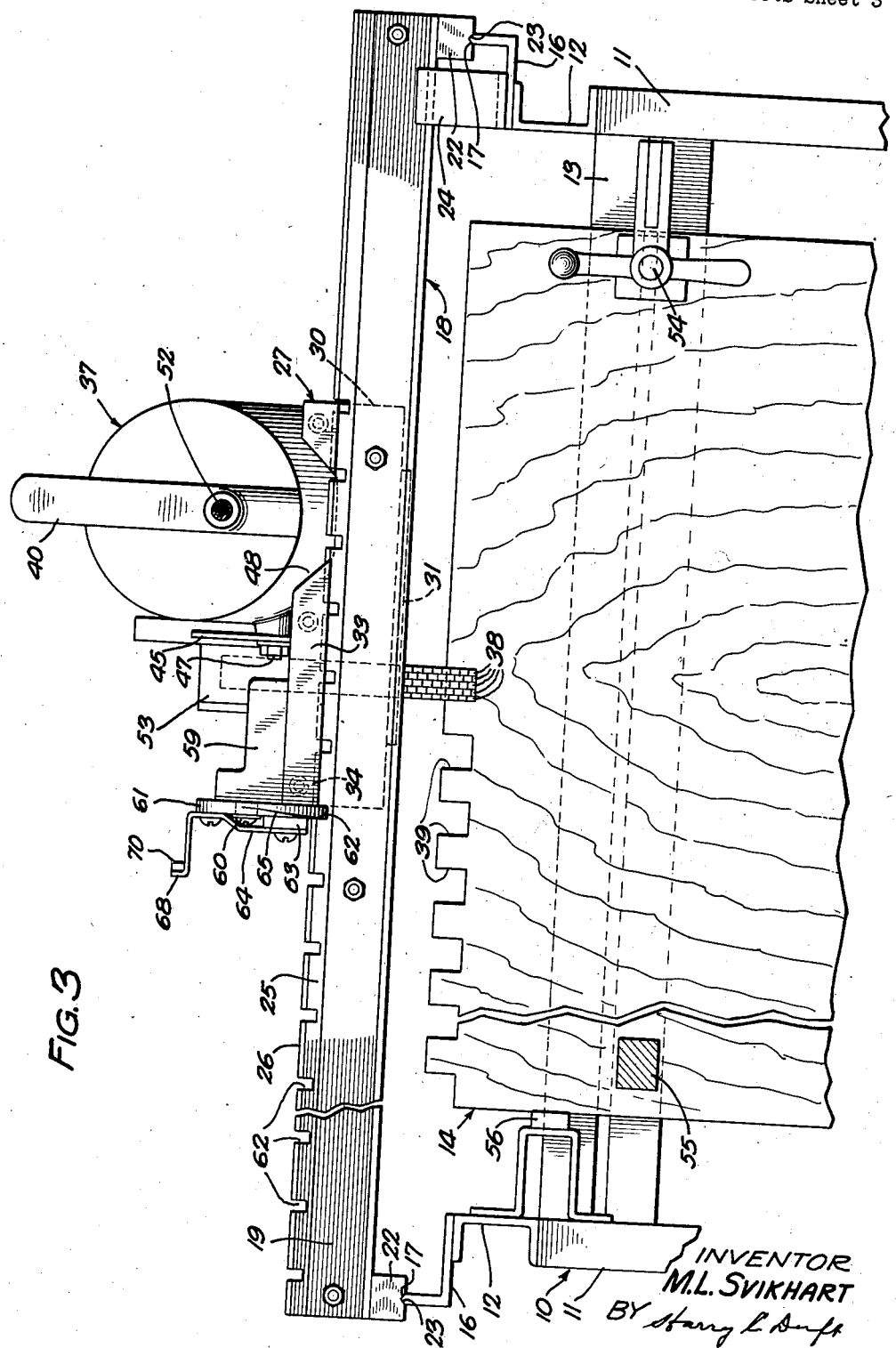

Patented July 18, 1944

2,353,794

UNITED STATES PATENT OFFICE 2,353,794

MATERIAL WORKING APPARATUS

Miles L. Svikhart, Garden City Park, N. Y., assignor to Western Electric Company, Incorporated, New York, N. Y., a corporation of New York Application December 8, 1942, Serial No. 468,214

2 Claims. (Cl. 144—133)

This invention relates to material working apparatus and particularly to material cutting apparatus.

Considerable difficulty has been experienced in the use of well known equipment for producing grooves for lock-corner joints of the required dimensions. The practice has been to saw the edges of a few panels at a time to produce simultaneously an entire series of grooves in each of the panels with a plurality of saws, but it has been difficult to maintain the saws properly supported in accurate alignment and adjusted in correct spaced relation to produce similarly dimensioned and uniformly spaced grooves for accurately interlocking in the grooves of other panels.

An object of the invention is the provision of a material cutting apparatus of a construction embodying the advantages of simplicity, efficiency in production and operation and facility of adjustment for different depths of grooves as well as an accurate spacing thereof.

In accordance with the above object, the present invention, in one embodiment thereof, as applied to the sawing of grooves for lock-corner joints in panels for containers of large dimensions, comprises a portable electrically driven saw pivotally mounted, to permit adjustment for depth of groove, on a laterally slidable table which, in turn, is supported on a carrier slidable at right angles to the movement of the saw supporting table. The carrier is slidable on a fixed frame in which a large number of panels are clamped. A single groove is sawed in each of the panels by a set of saws, the number of which determines the width of the groove. In operation, the carrier is moved forward to groove the panels and then retracted and thereafter the saw table is moved to position the saw laterally on the carrier for the succeeding grooving operation. To facilitate correctly positioning the saw laterally for successive grooves, a guide bar having a series of notches spaced similar to that of the desired spacing of the grooves is fixed to the carrier. Cooperating with the notched guide bar is a hand lever operated eccentric locking member journalled on the saw table and engageable in successive notches for retaining the saw in correct position during the grooving operation. Movable with the locking cam is a saw locating member which is inactive when the cam is in locking position but upon withdrawal of the cam and a lateral movement of the saw table, moves into locating engagement with a previously used notch. Thereafter, the lever is moved to operatively engage the locking cam in the aligned notch and the saw may then be advanced to complete the next groove in each of the panels.

Other objects and advantages of this invention will more fully appear from the following detailed description, taken in conjunction with the accompanying drawings, in which Fig. 1 is a plan view of a sawing apparatus embodying the features of this invention;

Fig. 2 is an enlarged fragmentary vertical sectional view taken on the line 2—2 of Fig. 1;

Fig. 3 is a fragmentary end view of Fig. 2, looking at the right end thereof;

Fig. 4 is a fragmentary view of Fig. 3 showing the eccentric locking cam in its inoperative position and the saw locating member in its operative position;

Fig. 5 is a side view of Fig. 4, looking at the left end thereof; and

Fig. 6 is a detail perspective view of the eccentric locking cam.

Referring to the drawings, particularly to Figs. 1, 2 and 3, the improved sawing apparatus comprises an open vertical supporting frame of structural steel, indicated in general at 10. The frame 10, which is shown fragmentarily in Figs. 2 and 3, consists of spaced sets of channel shaped upright bars 11 inter-connected at their upper ends, at each side of the frame, by horizontal bars 12 (Fig. 3) similar in type to the bars 11. Intermediate their upper and lower ends, the sets of spaced bars 11 are interconnected by horizontal sets of spaced angle bars 13, one of which is shown in Fig. 2. The sets of bars 13 also serve as supports for the work indicated at 14, clamped thereagainst in a manner to be referred to hereinafter. At their lower ends, the upright bars 11 are supported on a suitable structural steel open frame, not shown, having a wooden floor 15 (Fig. 1). The various structural steel frame members are united by electrical welding and provide a rigid supporting structure for the rest of the apparatus.

Welded to the upper face of each of the bars 12 is an angle bar 16, the vertical arms of which are shaped at their upper edges 17 to serve as spaced rails for slidably supporting a reciprocable carrier indicated in general at 18. The carrier 18 consists of a frame of angle bars 19 interconnected at their ends by solid cross bars 22, welded to their lower faces. The lower faces of the bars 22 are grooved at 23 to receive the rails 17. Stop members 24 attached to opposite ends of the frame 10 serve to limit the movements of the carrier 18 in reverse directions on the frame.

Bolted to inner opposed vertical faces of the angle bars 19 are flat bars 25 which are shaped at their upper edges 26 to serve as spaced rails, arranged at right angles to the rails 17, for slidably supporting a reciprocable saw table, indicated in general at 27. The table 27 consists of spaced angle bars 30 interconnected by a plate 31 which is bolted to the lower faces of the angle bars 30 at 32. Secured to each of the outer vertical faces of the angle bars 30 is a solid bar 33 which is grooved at 34 to receive the table rails 26.

The table 27 carries a commercial type portable electrically driven saw, indicated in general at 37, the arbor of which supports a plurality of dado type circular saws 38 sufficient in number to saw one notch or groove 39 at a time of the desired width in each of the upper edges of the series of work pieces 14, which, in the present instance, are wooden panels for chests or containers, when the saw is pushed forward, as viewed in Fig. 3, or to the left, as viewed in Figs. 1 and 2 by means of a handle 40. The saw 37 is pivotally attached at 41 (Fig. 2) to a mounting plate 42 which is attached to the table plate 31, the plates being notched at 44 to provide clearance for the saws 38. The depth of groove 39 to be sawed in the panels 14 may be varied by rocking the saw 37 about its pivot 41 either clockwise or counter-clockwise to raise or lower the saws 38 and thereafter clamping the saw in its adjusted position by means of a slotted bar 45 pivoted at 46 to the plate 41 and a stud bolt and nut 47, the bolt being fixed to the saw 37 and extending through the slot. The bar 33 at the rear end of the apparatus is cut and spaced apart at 48 (Fig. 3) to provide clearance for the saw 37 when rocked about its pivot 41. A switch trigger 51 on the saw handle 40 is provided for setting in motion the saws 38 and a flexible current supply conductor for the motor of the saw 37 is indicated at 52. The saw 37 is equipped with a safety guard 53. A plurality of suitable clamping members, indicated at 54 and 55, are mounted upon opposite sides of the frame 10 in vertical arrangement, which serve to clamp the panels 14 against the angle bars 13, the left edges of the panels abutting a bar 56 secured to the upright bars 11.

For the purpose of accurately positioning the saws 38 laterally for each succeeding grooving operation with facility and locking the table 27 carrying the saw 37 in such position, the following mechanism is provided. Fixedly mounted upon the forward bar (Figs. 3 and 4) is a supporting block 59, to one end of which is journalled, as indicated at 60, an eccentric disk or locking cam 61. Formed in the upper edge of the forward table rail 26 are a series of notches 62 of a width to snugly receive the cam 61 when engaged therein (Figs. 2, 3 and 4), the notches being spaced apart similar to the desired spacing between successive grooves 39 in the panels 14. Rigidly attached to the left face of the cam 61 (Figs. 3 and 4) is a lever 63 and a saw locating member 64, the lever serving as a hand grip for rotating the cam 61 and member 64 from the locking position of the cam shown in Fig. 2 to its inoperative position, shown in Fig. 5, during which movement the member is rotated from its inoperative position (Figs. 2 and 3) to its locating position (Figs. 4 and 5). The cam 61 is formed at one side adjacent its periphery with a cam face 65 (Fig. 6) for the purpose of easing the cam into the aligned notch 62 when the cam is rotated from its inoperative position (Fig. 5) to its locking position (Fig. 2). The saw locating member 64 is provided at its free outer end with a right angular extension terminating in a right angular arm 68, which is notched at 69 and the punched metal is turned inwardly to provide a stop face 70 which engages the right face of the notched bar 25 between the notches 62, as shown in Figs. 4 and 5, when the member 64 is rotated to its locating position from its inoperative position (Fig. 2), the arm 68 entering a notch 62 immediately to the left of the notch from which the cam 61 was last withdrawn. With the cam 61 entered in the notch 62, as shown in Fig. 2, it will be apparent that the saw table 27 is locked to the carrier 18 and cannot be accidentally moved laterally.

In using the apparatus and assuming that the carrier 18 has been retracted to the position shown in Fig. 2 after a grooving operation and thereafter the hand lever 63, carrying the cam 61 and saw locating member 64, has been rotated from the position shown in Fig. 2 to that in dotted outline in Fig. 5 and during such rotation by a slight lateral pressure on the hand lever, the saw table 27 has been shifted slightly to the right (Fig. 3) so that the left end (Fig. 5) of the arm 68 of the member 64 is abutting the right face of the notched bar 25 between adjacent notches 62. Thereafter, by a continued lateral pressure on the hand lever 63, the table 27 is laterally shifted with the arm 68 bearing on the face of the bar 25 and when the arm is aligned with the following notch 62, it will engage therein, the hand lever dropping to the position shown in full lines in Figs. 4 and 5. In this last described position of the member 64, the stop face 70 thereon serves to limit its rotary movement. Following this movement of the member 64, the hand lever 63 is rotated from its full line position (Fig. 5) to that shown in Fig. 2, and during this movement, the eccentric locking cam 61 is rotated into snug engagement with the aligned notch 62 (Fig. 3). This completes the locating and locking of the saw table 27 to the carrier 18 in position for the following grooving operation, which is then effected by pushing forward on the saw handle 40, during which movement the saws 38 cut a single groove 39 in each of the panels 14. Thereafter, the carrier 18 is retracted to the position shown in Fig. 2 and then, in the manner previously described, the saw table 27 is laterally shifted on the carrier 18 to locate and lock the same in proper position for the following grooving operation.

From the foregoing description, it will be apparent that a simple and efficient sawing apparatus is provided in which a large number of work pieces may be accurately grooved, a single groove at a time, in each work piece and the desired spacing between successive grooves accurately and readily controlled, as well as the depth thereof.

It will be understood that the embodiment herein described is merely illustrative of the invention and one application thereof and that modifications can be made and it is capable of other applications.

What is claimed is:

1. In a material sawing apparatus, a supporting frame, means on said frame for securing work to be formed with predeterminedly spaced grooves, a carrier mounted on said frame for movement along a fixed path, a table mounted for movement on said carrier along a fixed path at an angle to said first path, a rotary saw and operating means therefor on said table for sawing a groove in the work during movement of said carrier, means on said carrier providing a series of notches spaced to correspond with the desired spacing of the grooves to be formed, and table locking and locating members rotatable in unison on and movable with said table, said locking member having an eccentric peripheral portion for engagement in said notches, said locating member having a blade portion laterally spaced therefrom for engagement in said notches, each of said rotatable members arranged to alternately engage in said spaced notches during a complete operating movement thereof for withdrawing the locking member from one notch and upon lateral movement of the table on the carrier to engage the locating blade in said notch and position the locking member for engagement in an aligned notch and then to lock said table to said carrier.

2. In a material cutting apparatus, a support for work to be formed with predeterminedly spaced grooves, a carrier mounted on said support for movement along a fixed path, a table mounted for movement on said carrier along a fixed path at an angle to said first path, a cutter on said table for cutting a groove in the work during movement of said carrier, a member on said carrier having a series of notches spaced to correspond with the desired spacing of the grooves to be formed, and table locking and locating members rotatable in unison on and movable with said table, said locking member having an eccentric peripheral portion for engagement in said notches, said locating member having a blade portion laterally spaced from said locking member for engagement in said notches and a portion extending at an angle to said blade portion effective as a stop member engageable with surfaces between the notches of said member, each of said rotatable members arranged to alternately engage in said spaced notches during a complete operating movement thereof for withdrawing the locking member from one notch and engaging said stop member with said notched member and upon lateral movement of the table on the carrier to engage the locating blade in said notch and position the locking member for engagement in an aligned notch and then to lock said table to said carrier.

MILES L. SVIKHART.